Figure 1:
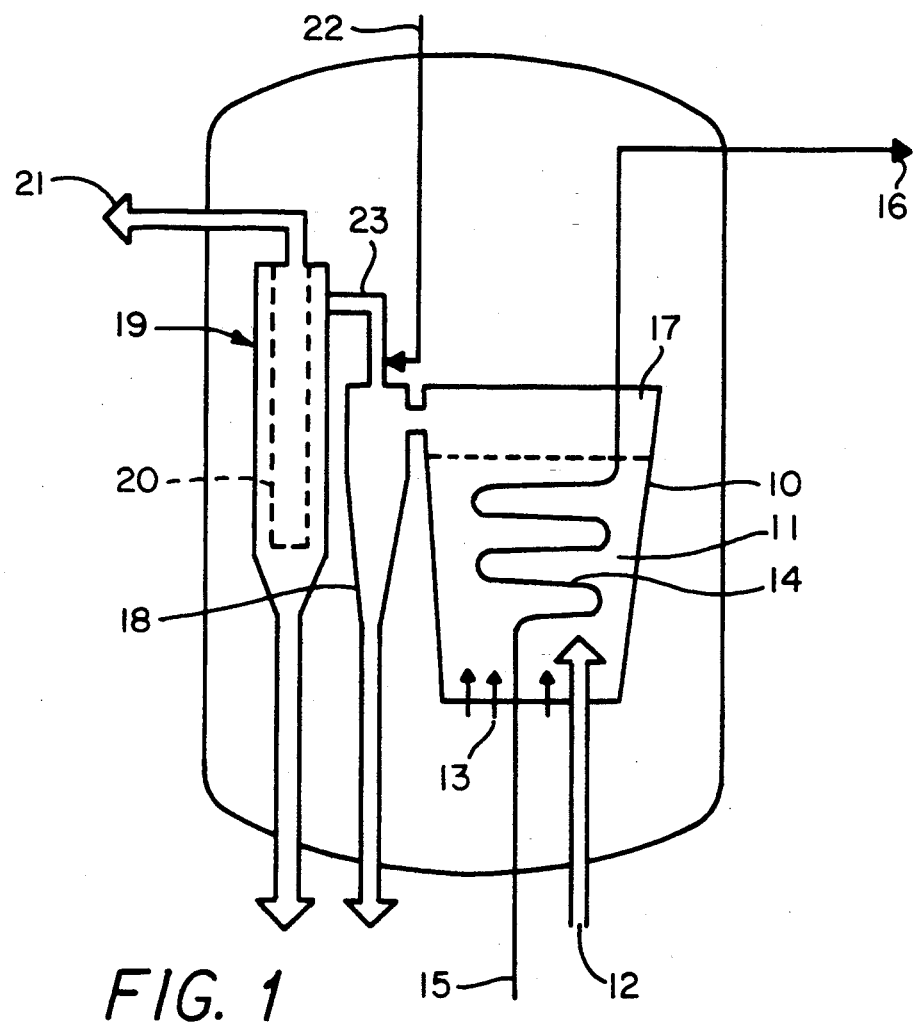

United States Patent [19]

Andersson et al.

[11] Patent Number: 5,407,649
[45] Date of Patent: Apr. 18, 1995

[54] METHOD FOR REDUCING THE EMISSION OF $NO_x$ IN A COMBUSTION PROCESS

[75] Inventors: Mats Andersson, Finspang; Hans-Jörgen Damsgaard, Västeras; Ingemar Greis, Västeras; Lotta Lindgren, Västeras; Olle Nyström, Finspang; Sven Ohlsson, Västeras; Henrik Wallman, Göteborg, all of Sweden

[73] Assignee: ABB Carbon AB, Sweden

[21] Appl. No.: 671,811

[22] PCT Filed: Aug. 7, 1990

[86] PCT No.: PCT/SE90/00516

§ 371 Date: Jul. 15, 1992

§ 102(e) Date: Jul. 15, 1992

[87] PCT Pub. No.: WO91/01793

PCT Pub. Date: Feb. 21, 1991

[30] Foreign Application Priority Data

Aug. 7, 1989 [SE] Sweden .................. 8902676

[51] Int. Cl.⁶ ............................................. B01D 53/34
[52] U.S. Cl. ................................. 431/7; 431/4; 423/239.1
[58] Field of Search ............ 423/239 VS, 239 A VS, 423/242.1, 244.01, 244.07. 244.08, 239.1; 431/4, 7

[56] References Cited

U.S. PATENT DOCUMENTS

| 4,154,803 | 5/1979 | Uckikawa et al. | 423/239 |
| 4,423,017 | 12/1983 | Dean | 423/235 |
| 4,782,771 | 11/1988 | Bergkvist | 110/345 |
| 4,793,981 | 12/1988 | Doyle et al. | 423/239 |
| 4,847,054 | 7/1989 | Weisweiler | 423/239 |

FOREIGN PATENT DOCUMENTS 3425070 1/1986 Germany .
1514529 6/1978 United Kingdom .

Primary Examiner—Wayne Langel
Assistant Examiner—Thomas G. Dunn, Jr.
Attorney, Agent, or Firm—Leydig, Voit & Mayer, Ltd.

[57] ABSTRACT

The invention provides a method for reducing the emission of $NO_x$ in a pressurized fluidized bed combustion process comprising (a) combusting reaction products in the presence of a sulfur absorbent in a pressurized fluidized bed at a pressure of at least 5 bar to form a flue gas comprising dust particles and an initial concentration of $NO_x$, (b) reacting the $NO_x$ in the flue gas with a substance which reduces $NO_x$ in a first reaction zone to form a flue gas which has a lower $NO_x$ concentration as compared to its initial $NO_x$ concentration, wherein the absolute pressure of the flue gas is at least 5 bar and the temperature of the flue gas is at least 450° C. in the first reaction zone, and (c) reducing the $NO_x$ concentration in the flue gas provided by step (b) in a second reaction zone by contacting the gas with a solid surface comprised of flue gas dust particles.

13 Claims, 3 Drawing Sheets

METHOD FOR REDUCING THE EMISSION OF $NO_x$ IN A COMBUSTION PROCESS

The invention relates to a method for reducing emission of $NO_x$ in a combustion process, wherein ammonia or another substance containing nitrogen, or a substance producing ammonia or nitrogen is supplied to the flue gas, and the obtained mixture is supplied to a reaction vessel.

U.S. Pat. No. 4,793,981 describes a method for controlling the emission of $SO_x$, $NO_x$ and particles from a coal fired boiler system, wherein a powder which is a reagent/catalyst is supplied to the flue gas between the boiler and an economizer and is made to react with $SO_x$ and $NO_x$, while the flue gas is passing through the economizer. An additional reaction is obtained when the flue gas is then led through filter bags and the accumulated filter cake thereof.

The publication KOLBLADET 89-3, 1989-03-20, describes purifying of flue gas at temperatures above 400° C. by means of suitable catalysts, by which $NO_x$ can be removed up to 90%. Ammonia and alkali are injected into the flue gas, and the mixture is then led through a ceramic filter bag on which ashes rich in alkali are deposited, through which the flue gas passes then to be brought into contact with a catalyst inside the filter bag.

In order to obtain a high $NO_x$-reduction, the ammonia is injected in a larger quantity than that corresponding to the stochiometric ratio. This over-dosage, which is made in order to overcome incomplete mixing and to obtain satisfactory $NO_x$ reduction, causes the unreacted ammonia to escape with the flue gases, so called "slip". U.S. Pat. No. 4,423,017 describes a way to reduce "slip" in a non-catalytic combustion procedure for reducing NO-emission, wherein a reducing gas comprising ammonia only or ammonia in combination with one or more reducing gases, is injected into flue gas, containing NO and oxygen, in a reaction zone. At the end of this zone a metallic material is placed so as to substantially reduce the discharge of ammonia into the atmosphere.

The method according to the invention is based on the conditions existing at combustion in a pressurized fluidized bed with addition of absorbant, for example limestone or dolomite. The dust that occurs in the flue gas from this combustion system has a special mineralogical composition and is of amorphous character. Compared to atmospheric combustion systems in which $SO_2$ is reduced by the addition of for example limestone ($CaCO_3$), a calcination to $CaO$ occurs, which is the active component against $SO_2$. The product is anhydrite, $CaSO_4$. Since the limestone due to inertia in the chemical reactions, always has to be supplied in surplus, there will always be $CaO$ in the flue gas dust in an atmospheric system. It is known that $CaO$ catalyses the formation of $NO_x$, i.e. the net yield for reduction of $NO_x$ with ammonia will potentially be lower when $CaO$ is present.

At combustion in a pressurized fluidized bed with supply of limestone (or dolomite), it has been found that $CaO$ is present neither in the flue gas dust nor in the discharged bed material. This condition is explained by the partial pressure of $CO_2$ being higher in a pressurized fluidized bed than in, for example, an atmospheric fluidized bed. The requirements for calcination at the current levels of temperature up to 1000° C. are not satisfied, which can be shown also thermodynamically. The sulphur absorbance in the limestone has been postulated to occur by direct substitution, $CaCO_3 + SO_2 + \frac{1}{2} O_2 \rightarrow CaSO_4 + CO_2$, in a pressurized system. Thus, the net yield for reduction of $NO_x$ by ammonia in the flue gas from a pressurized fluidized bed can become higher than in an atmospheric system. Furthermore, the dust and the sulphate surfaces, which are formed in sulphating the limestone, have a favourable effect by catalysing the $NO_x$-reduction.

With knowledge of these special conditions at combustion in a pressurized fluidized bed, the method according to the invention has obtained the characterizing features according to claim 1.

Figure 2:
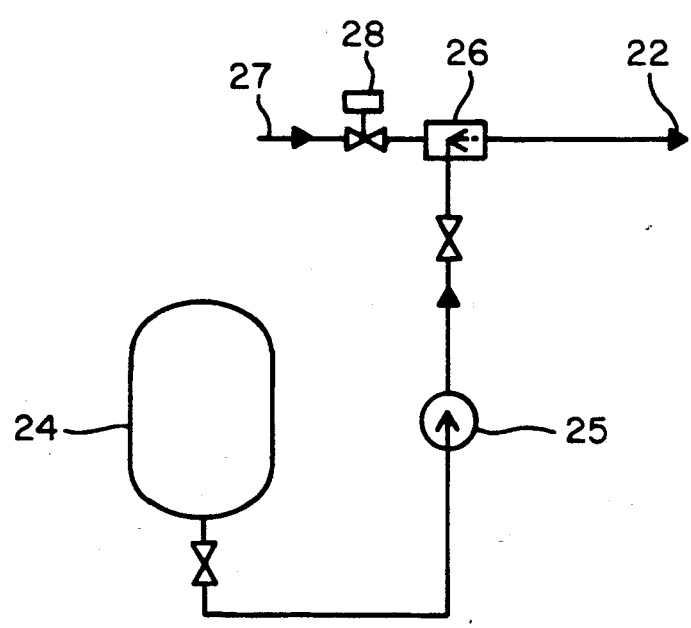
Figure 3:
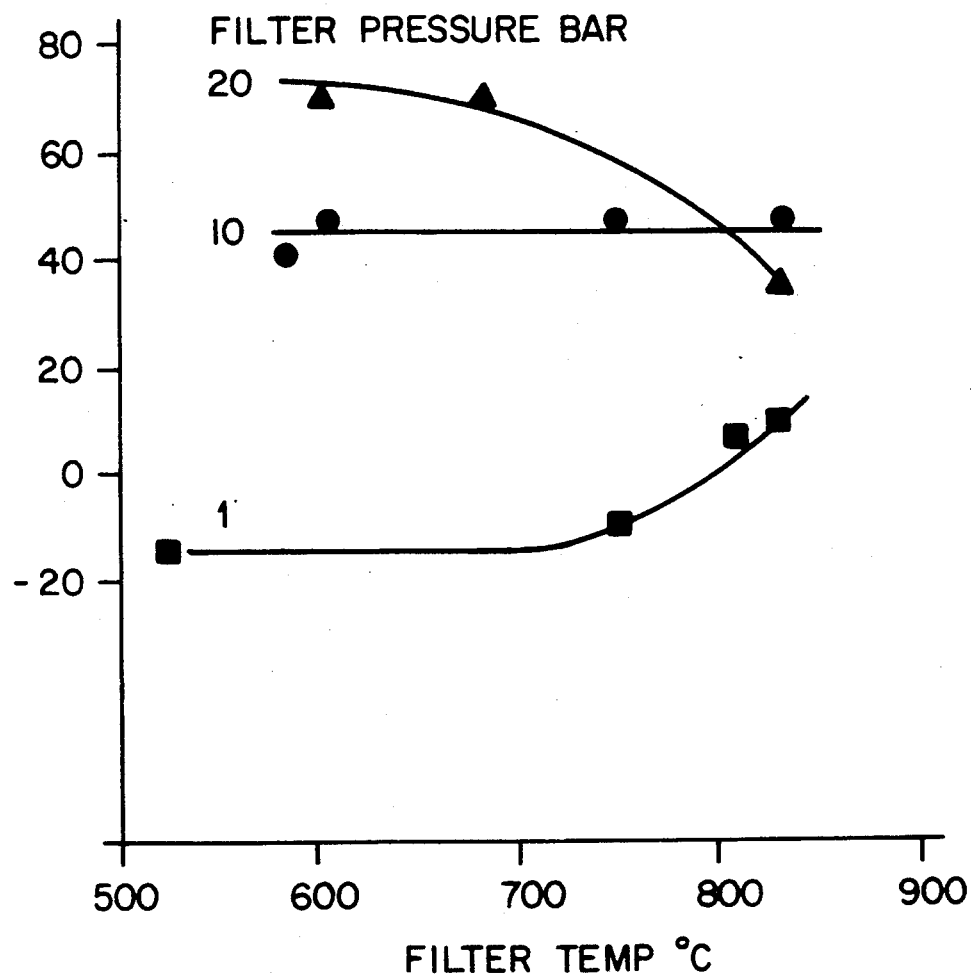
Figure 4:
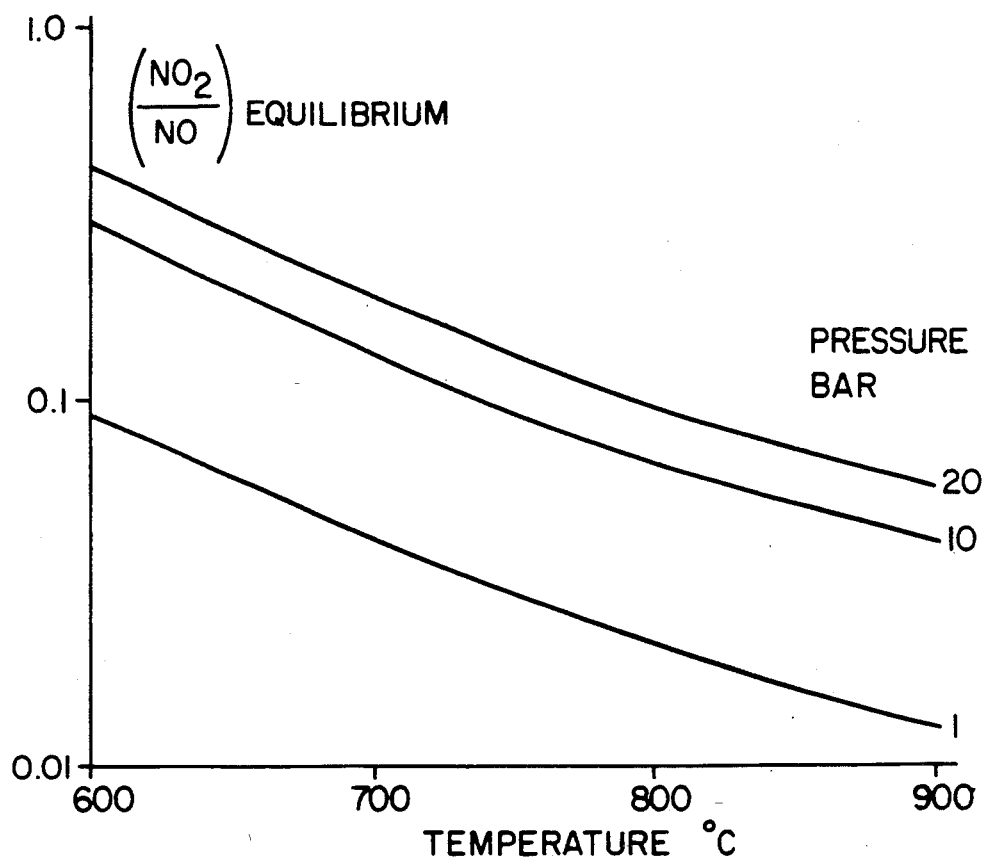
Figure 5:
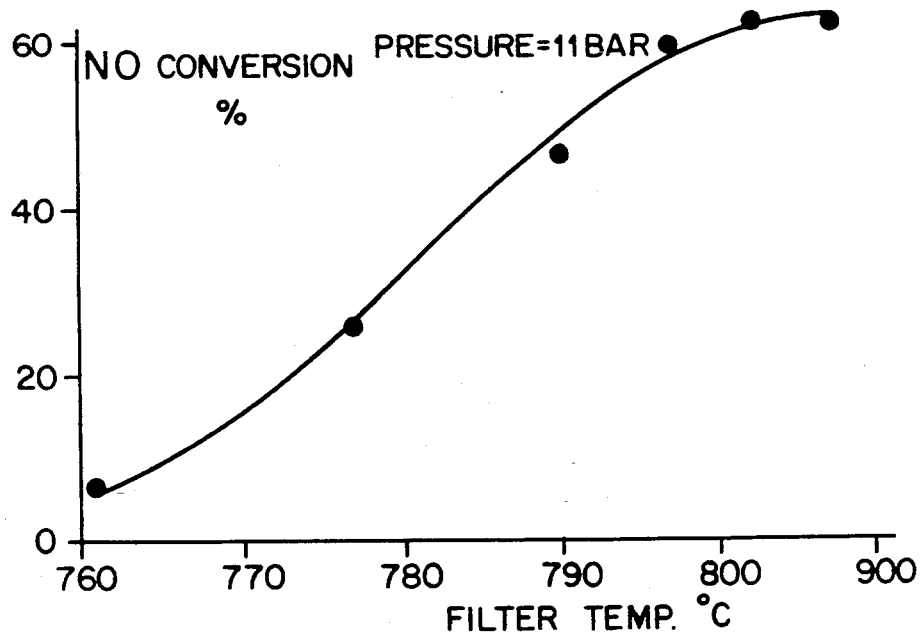

For further explanation of the invention, reference is made to the enclosed drawings in which FIG. 1 diagramatically shows a plant for practicing the method according to the invention, FIG. 2 is a diagram of a system for vaporizing caustic ammonia and following injection, FIG. 3 is a diagram showing the effect of pressure and temperature on the $NO_x$-conversion, FIG. 4 is a diagram showing the effect of pressure and temperature on the equilibrium ratio $NO_2/NO$ in flue gas with 6% $O_2$, and FIG. 5 is a diagram showing the influence of the temperature on the NO-conversion.

The plant according to FIG. 1 comprises a boiler 10 for combustion in a pressurized fluidized bed 11, which is supplied with particulate solid fuel, for example coal, and sulphur absorbent at 12 and with air at 13. The sulphur absorbent can consist of limestone or dolomite and, when the method according to the invention is applied, shall have a particle size which does not considerably exceed the particle size of the input fuel. In the bed, there is a tube system 14 to which is feed water is supplied at 15 and which supplies steam to a steam turbine at 16. Above the bed, there is a freeboard 17. From the freeboard flue gas with powder (ash particles and particles from the bed) suspended therein escapes to a cyclone device 18 (or an aggregate of cyclone devices) for coarse dust separation, and from there to a cyclone device 19 (or an aggregate of cyclone devices) for fine dust separation. The accomplished purification in the cyclone device or the aggregate 19 is sufficient for the gas to be used in a gas turbine, but in the present case the cyclone device 19 is supplemented with a filter 20 for concentration of the dust in the flue gas, so that the dust forms a solid surface in the form of a filter cake on the filter 20. The concentration of the dust particles can be achieved also in another way, for example by means of an electrostatic filter. The gas passes from the downstream side of the filter to a gas turbine at 21.

In or after the cyclone device 18 (or the last cyclone device, if an aggregate of cyclone devices 18 is provided), ammonia $NH_3$ or another nitrogen containing substance, or a substance producing ammonia or nitrogen is introduced at 22. In a typical case, the conditions at this place are: the temperature 450°–1000° C., the absolute pressure, depending on the load level, between 5 and 12 bar in presently existing combustion systems with pressurized fluidized bed (but a higher upper level of the order of 30 bar is aimed at), the particle concentration 0.1–100 g/m³, the oxygen content 1–10 mol-%, and the $NO_x$-concentration 30–500 ppm. The ammonia is injected at a flow rate, which is proportional to the total amount of $NO_x$ ($NO + NO_2$) in the flue gas to a stochiometric mixing ratio $NH_3/NO_x$ in the interval 1–5. The ammonia can be injected with or without a carrier, which can be air, flue gas, water steam, etc. through specially constructed nozzles that give effective mixing.

For an effective $NO_x$-reduction not only a favourable environment is required but also an effective injection of the ammonia, i.e. an injection which gives quickly the best possible admixing of the ammonia into the flue gas.

Ammonia is available as commercial goods either as "pure" ammonia, usually in liquid form, or as caustic ammonia which is a liquid water-soluble ammonia with about 25% $NH_3$. The security demands in handling caustic ammonia are not as rigorous as for pure ammonia, which means that caustic ammonia is preferred.

For good admixing of the ammonia into the flue gas, a large number of injection nozzles at 22 are required. Since a relatively small quantity of ammonia is to be distributed to many injection nozzles at sufficient speed, the injected volume must be large which necessitates for the ammonia to be vaporized. A good injection system must therefore manage to convert the chosen form of liquid ammonia to vapour form at a suitable pressure level and to inject the vapourized ammonia in such a way that a very good mixing in the flue gas occurs. If the injection occurs by means of a supporting medium, which is preferred, ammonia must be vaporized also in order to achieve a uniform mixing with the carrier.

FIG. 2 shows a system for achieving a good injection effect. From a supply tank 24 for caustic ammonia, the ammonia is pumped by means of a dosage pump 25 to a vaporizing nozzle 26 in which the ammonia is vaporized by means of strongly overheated steam, which is supplied at 27 via a control valve 28. The vaporizing nozzle can consist of a spray nozzle of the same type as used in conventional steam coolers of the spray type, but instead of pure water being sprayed into the nozzle and being vaporized thereby (in order to cool water steam) it is the caustic ammonia that is sprayed in order to be vaporized, and this occurs of course under a control which differs from that utilized at steam coolers. The steam can be withdrawn from the plant in FIG. 1 at 16 and can have a temperature of 530° C. and a pressure of 130 bar. The injection pressure can vary between 13 and 30 bar. The steam not only vaporizes the ammonia but also gives the necessary impulse in the injection nozzles.

The requirements on the injection system in a combustion plant with pressurized fluidized bed are very difficult to satisfy with conventional injection systems. If, for example, flue gas or air would be used as a carrier in a conventional system, expensive equipment such as compressors, filters, boilers, coolers, etc. is necessary as well as a complicated control system for a satisfactory function. If caustic ammonia is used, there is also a risk for the water content thereof to increase the acid dewpoint in case the carrier is flue gas so that problems with condensation in the injection system proper arise. Therefore, flue gas cannot be used as a carrier for caustic ammonia but for "pure" ammonia. The injection system shown herein for caustic ammonia is considerably simpler than conventional systems previously used and allows overheated water steam to be used both for vaporizing the ammonia and as a carrier in sufficient quantity to achieve the necessary injection impulse. In the combustion system with pressurized fluidized bed there is always overheated steam at disposal at a pressure which is considerably higher than the pressure in the combustion system, resulting in the proper pressure ratio over the injection nozzles always being obtained. The control of the injection system then becomes very simple:

the amount of ammonia is controlled by means of the dosage pump 25 according to the needs of the $NO_x$-reduction process, and the pressure ratio over the injection nozzles is controlled by means of a steam control valve 28, so that the pressure level before the nozzles always exceeds a required minimum value, and the mixing temperature for ammonia and steam is kept within given limits.

As mentioned above, a large number of injection nozzles at 22 are required for good admixing of the ammonia into the flue gas, but a high injection impulse is also required. If the number of injection nozzles is denoted N and the injection impulse is denoted $\dot{m}*w$, where $\dot{m}$ is the mass flow in the injection nozzles and w is the velocity in the injection nozzles, the mixing is $\sim N*\dot{m}*w$. A large N or a small $\dot{m}$ or a large w means small diameters of the injection nozzles, but since there is practical minimum limits for the nozzle diameter the result is that $\dot{m}$ must be large in order to achieve acceptable impulses in the injection nozzles. The carrier, which together with the ammonia constitutes $\dot{m}$, contributes to maintaining a high injection impulse.

For obtaining of a large impulse $\dot{m}*w$, a high velocity w is required, and for obtaining of a high w, a large pressure ratio (pressure drops) over the injection nozzles is required. The pressure before the nozzles, i.e. into the injection system, should be >50% higher than the pressure after the nozzles, i.e. in the reduction zone in the flue gas passage. The pressure of the flue gas system at a combustion process with pressurized fluidized bed varies with the load level, as mentioned above, which puts high demands on the injection system proper which must be able to adjust the pressure before the injection nozzles to the proper pressure ratio relative to the combustion process, independent of the flow rate of ammonia presently required. In the injection system proposed herein, the flow of the carrier is controlled by means of the steam valve 28 in order to obtain the proper pressure ratio over the injection nozzles.

The beams from the injection nozzles must be directed relative to the flue gas stream with consideration of the flow pattern at the injection place.

From the injection point 22, the mixture of flue gas and ammonia flows through a tube length 23 in which the reaction components are additionally mixed, and this tube length can possibly be provided with baffles in order to increase the mixing effect.

The premixed reaction components enter the reaction chamber, which is formed by the tube length 23 and the cyclone device 19 connected thereto, and in this reaction chamber two distinct reaction zones located one after the other can be distinguished. The first reaction zone is the space which is delimited in the tube length 23 and in the cyclone device 19 around the filter 20, and this reaction zone will give a dwelling time for the gas mixture with dust particles suspended therein of the order of 1–10 s therein for reduction of $NO_x$ with $NH_3$ to nitrogen gas ($N_2$). The second zone consists of a solid surface comprising dust which has been concentrated on the filter 20 and has formed a filter cake there, and the principle purpose of this second zone is to decompose remaining unreacted ammonia, but the upstream part of the filter cake also serves as a $NO_x$-reducting zone by the surface of the filter formed by the fine dust giving the conditions for heterogeneous/cathalytic reactions between $NO_x$ and $NH_3$. FIG. 3 shows the effectivity of the procedure according to the invention on the basis of the accomplished laboratory experiments. As disclosed in the diagram in the figure, an increase of pressure at otherwise constant conditions leads to a pronounced increase in the conversion of $NO_x$ to $N_2$. At atmospheric pressure even a negative conversion is obtained, which indicates the formation of $NO_x$ from the added ammonia. As disclosed in FIG. 3, the largest difference between high and low pressure is obtained in the lower range of temperature. This is explained by the fact that the contribution from $NO_2$ to the overall $NO_x$-conversion increases with the pressure, which means that $NO_2$ is a probable intermediate product in the conversion of NO to $N_2$. This can be utilized in the method according to the invention by an injection place located upstreams being used for injecting a chemical, for example $H_2O_2$, hydrocarbon or another oxidizing agent, which oxidizes NO to $NO_2$ before $NO_2$ is then reduced by $NH_3$ in a subsequent step.

By the method according to the invention being applied to the treatment of flue gas from combustion in a pressurized fluidized bed for reduction of $NO_x$ with $NH_3$, favourable conditions at this type of combustion are utilized, namely high pressure which has a favourable effect on the reactions, increased $NO_2$-content, the favourable chemical and mineralogical composition of the ashes and the amorphous character thereof, long dwelling time at high (optimal) temperature.

These conditions give a high reduction in a working range, which is characterized by process pressure, gas temperature and excess of oxygen, that is wider than in corresponding atmospheric systems. In such a system the conversion of $NO_x$ to $N_2$ with $NH_3$ ceases for example at temperatures below 750° C. The favourable conditions in the environment present at combustion in a pressurized fluidized bed, are demonstrated by the above-mentioned laboratory tests.

The thermodynamical data as disclosed in FIG. 4 also explain why the conversions at high pressure which are shown in FIG. 3 are relatively unaffected by the temperature. FIG. 4 shows that higher temperatures are thermodynamically unfavourable regarding $NO_2$, and consequently the elimination of $NO_x$ via $NO_2$ is expected to be less important at higher temperatures. However, higher temperatures favour the direct reduction of NO to $N_2$, as shown in FIG. 5 for the filter model (at slightly different working conditions than in FIG. 3). Consequently, the explanation of the constancy in the elimination of $NO_x$ at high pressure according to FIG. 3 is that two reactions with opposite temperature trends are superposed on each other with a very favourable net result as a consequence thereof: good conversion for elimination of $NO_x$ is obtained through the whole temperature range which is of practical importance.

The admixture of ammonia can also occur in two or more steps, that is, not only at the place 22. As to the dwelling time, these steps are to be evenly distributed from a first injection place, which can be located at the freeboard 17, to a last injection place, which can be located to the filter 20. The advantages with such a multi-stage injection are several. The utilization of ammonia can be increased under maintained or decreased content of unreactive ammonia, so called "slip", in the flue gas. The effects are achieved by imperfectnesses in the distribution and admixture in a previous step being repaired in a subsequent step. The importance of good distribution and admixture follows from the present chemical reactions, the desired ones as well as the competing ones, the latter for example those which dissociate and oxidize injected ammonia, before it has had time to reduce $NO_x$, are very fast, of the order of 10–100 ms. The shorter time concerns especially the heterogeneous reactions and the longer time the homogeneous reactions. Reaction technical data show that of the two components, $NO_2$ is reduced before NO at reduction of $NO_x$ with ammonia. This is a fact which favours multi-step injection especially at the conditions existing at the combustion in a pressurized fluidized bed with increased pressure, moderate process temperature, and excess of oxygen when the formation of $NO_2$ is thermodynamically favoured. This means that the $NO_2/NO$ ratio is higher at combustion in a pressurized fluidized bed than in an atmospherically driven combustion process Multi-step injection then creates the conditions for unreduced NO from an initial zone to be reduced in a following step as $NO_2$, since the equilibrium tries to reestablish the $NO_2/NO$ ratio to the original value by the reaction $2NO+O_2 \rightleftharpoons 2NO_2$. Since $NO_2$ is the first component to be reduced, the total reduction becomes higher at multi-step injection than at one-step injection at otherwise maintained conditions.

The multi-step injection also makes possible the choice of a suitable place for injection of $H_2O_2$, hydrocarbon, or another oxidizing agent, as mentioned above. This injection has to occur where the flue gas temperature is less that 800° C., which in practice means that the injection must occur in the freeboard 17 of the boiler or in the cyclone devices 18 or 19. $H_2O_2$ and $NH_3$ then are mixed at an optimal molar ratio.

We claim:

1. A method for reducing the emission of $NO_x$ in a pressurized fluidized bed combustion process comprising (a) combusting reaction products in the presence of a calcium-based sulfur absorbent in a pressurized fluidized bed to form a flue gas comprising dust particles and an initial concentration of $NO_x$, (b) reacting the $NO_x$ in the flue gas with a nitrogen-based $NO_x$ reducing substance in a first reaction zone to form a flue gas which has a lower $NO_x$ concentration as compared to its initial $NO_x$ concentration, said substance being introduced at a site wherein the absolute pressure of the flue gas is from 5 bar to 30 bar and the temperature of the flue gas is from 450° C. to 1000° C., and (c) passing said substance and said flue gas from said first zone to a second reaction zone and contacting said substance and said flue gas with a solid surface comprising a filter cake comprised of flue gas dust particles in a second reaction zone in order to effect a further reduction of the $NO_x$ concentration in the flue gas by catalytic reaction at said surface and decomposition of said substance remaining in the flue gas.

2. The method according to claim 1, wherein the concentration of the dust particles is achieved by passing the flue gas through a filter so that the dust particles are collected as a filter cake on the filter.

3. The method according to claim 1, wherein the added absorbent has a maximum particle size of the same order as the maximum particle size of the fuel supplied to the bed.

4. The method according to claim 3, wherein the substance is ammonia and is provided by vaporizing ammonium hydroxide by means of steam which is used as a carrier.

5. The method according to claim 1, wherein the substance is introduced into the first reaction zone by injection in several steps.

6. The method according to claim 1, wherein the substance includes a carrier.

7. The method according to claim 6, wherein the carrier consists of steam.

8. The method according to claim 1, wherein the substance is introduced into the first reaction zone by injecting the substance through injection nozzles located at a plurality of injection sites in the first zone.

9. The method according to claim 2, wherein the substance comprises a carrier which is under pressure, the pressure of the carrier being greater than 50% higher prior to its injection through the nozzles than after its injection through the nozzles.

10. The method according to claim 1, wherein the sulfur absorbent comprises limestone.

11. The method according to claim 1, wherein the sulfur absorbent comprises dolomite.

12. The method according to claim 1, wherein the substance is introduced into the first reaction zone by injecting the substance through injection nozzles located at a plurality of injection sites in the first zone.

13. The method according to claim 6, wherein the substance comprises a carrier which is under pressure, the pressure of the carrier being greater than 50% higher prior to its injection through the nozzles than after its injection through the nozzles.

* * * * *